Jan. 2, 1951 | I. A. F. HOOD ET AL | 2,536,501

ATTENUATOR FOR ELECTRIC CIRCUITS

Filed Aug. 30, 1946

Inventor
IAN A. F. HOOD and
WARREN G. LUMB
By
[signature]
Attorney

Patented Jan. 2, 1951 2,536,501

UNITED STATES PATENT OFFICE 2,536,501

ATTENUATOR FOR ELECTRIC CIRCUITS

Ian A. F. Hood and Warren G. Lumb, Sydney, New South Wales, Australia, assignors to Amalgamated Wireless (Australasia) Limited, Sydney, New South Wales, Australia, a company of New South Wales, Australia Application August 30, 1946, Serial No. 694,040
In Australia April 29, 1946

9 Claims. (Cl. 178—44)

Figures 1, 2, 3:
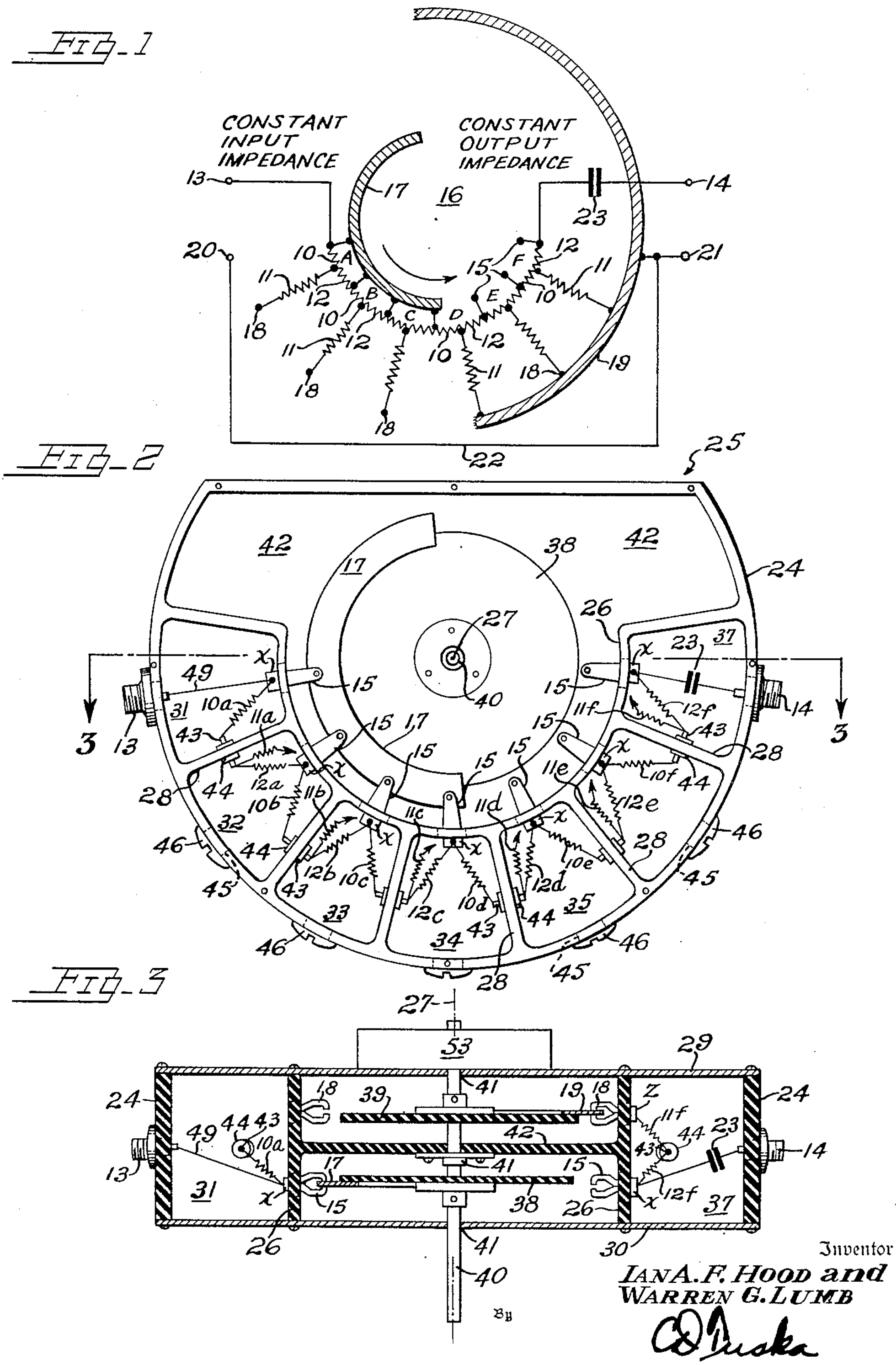

The present invention relates to attenuators generally and more particularly to attenuators suitable for use with signal generators and other apparatus where accurate control over a wide range of frequencies and attenuation is required.

In the past, attenuators for signal generators for frequencies up to 50 megacycles have generally employed circuits of the well known resistance ladder-network type.

In these prior art arrangements the input of the resistance ladder-network is permanently connected to the output circuit and output voltmeter of the signal generator. The output of the network is taken to the output cable of the signal generator from successive points on the ladder-network, selection being made by an attenuator switch.

With this resistance ladder type of network it has not been possible in the past to maintain both the input and output impedances constant over the range of attenuator switch positions, and the usual practice has been to maintain a constant output impedance at the expense of an input impedance varying with adjustment of the attenuator switch.

The variation of input impedance in accordance with position of the attenuator switch is objectionable for two reasons. Firstly, the varying load presented by the attenuator can have an adverse effect on the performance of the signal generator. Secondly, the reading of the voltmeter connected across the input of the attenuator alters with position of the attenuator switch thus necessitating a readjustment of the attenuator input voltage at each position of the attenuator switch. This is an undesirable inconvenience, particularly when the output is required to be altered by switching the attenuator only.

In resistance ladder type attenuators of conventional construction there exists by way of the output circuit of the attenuator a low resistance D.-C. path to earth. Consequently, if the output of the attenuator is connected between a voltage source and earth the attenuator resistors can be damaged or even burnt out by the passage of an excessive current through them. This could be prevented by the addition of a blocking condenser of suitable size in series with the output. In previous designs, however, physical limitations presented by the problem of connecting a large capacitor between the output and the moving arm of the attenuator switch prevented the use of this protective device.

In resistance ladder attenuators constructed in accordance with prior art practices, switching from one position to the next produced either shorting of network sections, open-circuiting, or short-circuiting to earth of the attenuator output. Furthermore in order to maintain attenuation accuracy up to 50 megacycles over the large range of attenuation generally required (120 db) considerable care had to be taken in the design of the network resistors, the switch contacts, and the shielding between the network sections.

The object of the present invention is to overcome the abovementioned objectionable features associated with attenuators as previously constructed and provide an improved wide range attenuator of the resistance ladder-network type which incorporates the following desirable features:

(a) The input and output impedances may be maintained constant over the whole range of attenuator switching.

(b) A simple method of attenuator switching which permits the use of permanent connections to the input and output of the attenuator without introducing mechanical limitations which would prevent the addition of a protective capacitor in series with the output.

(c) A switching arrangement in which neither short-circuiting to earth nor open-circuiting of the attenuator output occurs when passing from one switch position to the next.

(d) A simple robust and economical mechanical arrangement which is easy to construct, reliable in operation and facilitates adequate shielding of the resistance elements of the network sections.

The above objectives are achieved in accordance with the present invention by an improved wide range attenuator comprising a number of T type resistance sections permanently connected in series between input and output terminals of said attenuator, attenuation control means being associated therewith and adapted to control the functioning of individual T type sections in such a manner as to vary the effective number of said T type sections between said input and output terminals, and consequently the attenuation of the network, without varying the value of the input and output impedances of said attenuator.

For a more complete understanding of the invention and the manner in which it is to be carried into practical effect, attention is now directed to the following description in connection with the accompanying drawings in which:

Figure 1 illustrates the circuit arrangement of an attenuator constructed in accordance with the present invention, Figure 2 illustrates one mechanical arrangement of the circuit components of Fig. 1, and Figure 3 is a sectional view of the mechanical arrangement in Fig. 2 taken on the line 3—3. Similar reference characters are applied to similar elements throughout the drawing.

Referring to Figure 1 a plurality of T type resistance sections A, B, C, D, E and F are connected in cascade between the high potential input and output terminals 13 and 14 respectively.

Each T type section is composed, in accordance with conventional practice, of three wire-wound non-inductive resistors 10, 11 and 12. In Figure 2 the corresponding resistors of the respective sections are identified by appended letters appropriate to the section with which they are associated.

The resistors 10 and 12 of each section are connected in series and constitute the series arms of the T section while one end of each resistor 11 is connected to the junction between the resistors 10 and 12 of the respective section and functions as the shunt arm of that section.

The arms 10 and 12 of each of the T sections A, B, C, D, E and F are connected in series with each other between the high potential input and output terminals 13 and 14 respectively of the attenuator.

The outer terminals of the series arms 10 and 12 of each section are also connected to the fixed contacts 15 of an attenuator switching device 16. The nature of these connections is such that the junction between the series arms 12 and 10 of adjacent sections is connected to the same fixed contact point 15 on the switch 16.

Associated with the fixed contacts 15 is a movable contactor 17. This movable contactor 17 is adapted to progressively insert or remove a short-circuit connection between adjacent fixed contacts 15.

The free end of the resistors 11 constituting the shunt arms of each section are connected to individual fixed contacts 18.

Associated with the fixed contacts 18 is a movable contactor 19. The movable contactor 19 is adapted to progressively insert or remove a short-circuit connection between adjacent contacts 18.

The movable contactor 19 is conductively connected to the low potential terminals 20 and 21 of the attenuator input and output terminals respectively by the lead 22.

The arrangement of the movable contactors 17 and 19 is such that when the series arms 10 and 12 of any of the sections A, B, C, D, E or F are short-circuited by the movable contactor 17 the connection between the terminal contacts 18 of the shunt arm 11 of the same section, and the line 22, is open-circuited by movement of the contactor 19.

Conversely when the short-circuit is removed from across the series arms 10 and 12 of any section A, B, C, D, E or F by operation of the movable contactor 17 the operation of the contactor 19 should be such as to cause the terminal contact 18 of the shunt arm 11 of the same section to be connected to the line 22.

From the foregoing it will be seen that the movable contactors 17 and 19 function to remove effectively one or more of the T resistance sections A, B, C, D, E and F from between the input terminals 13 and 20 and output terminals 14 and 21 by short-circuiting the series arms and opening the shunt arms of the unwanted sections. For example in Fig. 1 three T sections D, E and F are shown connected between the input and output of the attenuator. Movement of the contactors 17 and 19 simultaneously in an anticlockwise direction through one switch position will reduce the attenuation of the network by short-circuiting the series arms 10 and 12 of section D and open-circuiting the shunt arm 11 of the same section thus leaving only two T sections E and F effectively connected between the input and output of the attenuator.

Since complete T sections are removed and inserted concurrently the input and output impedances of the attenuator will remain constant.

Due to the fact that the output of the serially connected arms 10 and 12 of the T section cascade is connected to the output terminal 14 of the attenuator direct and not through the attenuator switch in accordance with conventional practice, a blocking condenser 23 may be conveniently connected in series with the output circuit to prevent damage to the attenuator resistors when the output is connected across a D.-C. voltage source, without introducing any mechanical complications.

In order to simplify the control of attenuation the movable contactors 17 and 19 are preferably coupled together in any convenient manner for simultaneous operation.

Any desired mechanical arrangement of the movable contactors 17 and 19 and their associated fixed contacts 15 and 18 may be employed so long as they function to insert effectively into or remove from the attenuator network complete resistive sections when operated to increase or reduce the attenuation of the network respectively without breaking the consecutive connection of the series arms between the input and output terminals.

The preferred mechanical arrangement for practical application of the present invention is illustrated by Figures 2 and 3 of the accompanying drawing.

In these two figures like parts are designated by corresponding reference numerals. The attenuator housing 25 which may be a casting has two arcuate walls 24 and 26 concentrically disposed about a common axis 27 and is formed with radial partitions 28 and is provided with detachable front and back covers 29 and 30. The arrangement of the housing 25 is such as to form a plurality of small shielded compartments 31 to 37.

The resistance components 10, 11 and 12 of the sections A, B, C, D, E and F of the attenuator network are conveniently disposed in the appropriate compartments 31 to 37 as hereinafter described.

Each shielded compartment 31 to 37 is provided with a pair of insulated terminals X and Z (see Figure 3) secured in spaced relationship in and extending through the inner wall 26 of the housing 25.

Those portions 15 and 18 of each of the terminals X and Z respectively which extend beyond the shielded compartment in which the latter are located are designed to be engaged by one of the two movable contactors 17 and 19.

The arrangement of the fixed terminals X and Z in each compartment in the present example is such as to form two arcuate rows symmetrically disposed.

The terminal X in each compartment is located in one row while the terminal Z in the same compartment is located in the other row.

The two aforesaid rows are arranged in parallel planes perpendicular to the axis 27 of the attenuator housing 25. The separate rows of contacts 15 and 18 are adapted to be engaged by the movable contactors 17 and 19 respectively.

These contactors in the present example are in the form of insulated blades approximately semi-circular in shape and carried by rotatable members 38 and 39 of any convenient construction affixed to shaft 40.

The shaft 40 whose axis coincides with the axis 27 of the attenuator housing 25 is supported in any convenient manner for angular rotation.

In the present example the shaft 40 is mounted in bearings indicated by 41 but not shown arranged in the front and back cover plates, and in an additional bearing in a vertical partition 42.

A clicking contrivance or the like of any known construction and generally indicated at 53 may be associated with the shaft 40 to ensure accurate location of the contactors 17 and 19 at the desired switch positions.

In Figure 3 it will be seen that the movable contactor 17 is associated with the arcuate row of contacts X while the movable contactor 19 is associated with the arcuate row of contacts Z.

The semi-circular blades comprising separate movable contactors 17 and 19 are mounted on their respective supporting members 38 and 39 in opposite relationship. The mounting is such that one end of contactor 17 lies approximately in juxtaposition with one end of the contactor 19. The two semi-circular contactors thus form in spaced relationship what really amounts to a divided circle.

In Fig. 2 it will be seen that separate conductive connections 43 pass through insulating bushings 44 in the partitions 28 between adjacent compartments.

Each compartment 31 to 37 is provided with an aperture 45 in the outer wall 24 to receive an insulated input or output terminal.

These apertures 45 enable said input and output terminals to be located in convenient positions to allow of the required number of T sections for any desired value of maximum attenuation to be selected. Suitable plugs 46 may be placed in the apertures 45 which are not in use.

In the present example the input and output terminals 13 and 14 are fitted with respect to compartments 31 and 37 respectively.

The input terminal 13 is conductively connected to the contact terminal X in the same compartment 31, by means of the lead 49. This contact terminal X is also connected to the first insulated stud 43 through the resistance 10*a* which constitutes one series arm of the first T section A. The other end of said stud 43 lies in the adjoining compartment 32 and is therein connected to the contact terminal X through the resistance 12*a* and to the contact Z through the resistance 11*a*. The resistors 12*a* and 11*a* form the second series arm and shunt element respectively of the T section A.

The series and shunt arms of succeeding T sections of the network are progressively connected in similar manner in the remaining shielded compartments of the unit. For instance the arm 10*b* is connected between the terminal X in one compartment and the stud 43 leading to the next adjoining compartment, while the shunt arm resistor 11*b* and the other arm 12*b* of that T section are respectively connected between the other side of the stud 43 and the contact terminals Z and X in said next adjoining compartment.

In the last compartment 37 of the unit the contact terminal X to which the series arm 12*f* of the last T section F is connected is coupled either direct or through a blocking condenser 23 to the output terminal 14.

With the mechanical arrangement thus described, when the shaft 40 with contactors 17 and 19 is turned so that the contactor 17 is completely out of any engagement with its associated contacts 15 the contactor 19 is fully engaged thus short-circuiting all of its associated contacts 18, and vice-versa. When the contactor 17 is rotated in an anti-clockwise direction to the first switch position it engages the contact 15 of the shielded compartment 32 thus electrically short-circuiting the series arms 10*a* and 12*a* of the first T section A (see Fig. 1) of the attenuator network. At the same time however the simultaneous movement of the contactor 19 causes it to become disengaged from the contact 18 of the same compartment thus breaking its connection with the shunt arm 11*a* of the first T section A.

In the switch position just referred to, the first T section A of the network is eliminated by simultaneously short-circuiting the series arms 10*a* and 12*a* and open-circuiting the shunt arm 11*a* of the section.

In the second position of the switch the second T section B (see Fig. 1) is also cut out of the network through the short-circuiting of the series arms 10*b* and 12*b* by the contactor 17 and open-circuiting of the associated shunt arm 11*b* by the contactor 19.

In succeeding switch positions further complete T sections are progressively eliminated from the attenuating network.

When the control shaft 40 is operated to rotate the contactors 17 and 19 in a clockwise direction the operation is the reverse of that described above.

The contactor 17 now functions to remove the short-circuit between adjacent contacts 15 and the series arms 10 and 12 of the respective T section while the contactor 19 simultaneously makes connection with the shunt arm 11 of the section concerned.

Complete T sections are thus effectively and progressively inserted between the input and output terminals 13 and 14 thus maintaining a constant input and output impedance for each position of the attenuator switch over the whole range of attenuation.

Although in the present example an attenuator unit in accordance with the present invention has been described as comprising six resistance T type sections it will be obvious to those skilled in the art that a greater or lesser number of sections may be employed if desired without affecting the operation of the invention.

It will also be readily appreciated that an attenuator unit in accordance with the present invention facilitates the use of a mechanical arrangement which permits the input and output connections to be carefully shielded and well separated, convenient mounting and ready accessibility of all resistance components, the use of exceptionally short leads to the network components and adequate shielding between adjacent sections. These features permit accurate attenuation at all frequencies up to 50 megacycles over an attenuation range as great as 120 db.

We claim as our invention:

1. A constant shunt impedance attenuator including input and output circuits, a plurality of T-network impedance sections having their respective branch arms serially connected between said input and output circuits, a plurality of first contacts connected to predetermined points on said serially connected arms, a plurality of second contacts connected to the open terminals of the shunt resistors of each of said T-network sections, separate short-circuiting contactors in selective operative relation with said first and second contacts, and means for actuating said contactors simultaneously to short-circuit predetermined ones of said first contacts and to open-circuit predetermined ones of said second contacts respectively, whereby complete T-network sections are switched in and out of the circuit connecting said input and output circuits and the input and output impedances of said attenuator remain substantially constant.

2. A constant shunt impedance attenuator including input and output circuits, a plurality of T-network impedance sections having their respective branch arms serially connected between said input and output circuits, a plurality of first contacts connected to the junctions of said serially connected arms, a plurality of second contacts connected to the open terminals of the shunt resistors of each of said T-network sections, separate short-circuiting contactors in selective operative relation with said first and second contacts, and means for actuating said contactors simultaneously to short-circuit predetermined ones of said first contacts and to open-circuit predetermined ones of said second contacts respectively, whereby complete T-network sections are switched in and out of the circuit connecting said input and output circuits and the input and output impedances of said attenuator remain substantially constant.

3. A constant shunt impedance attenuator including input and output circuits, a plurality of T-network impedance sections having their respective branch arms serially connected between said input and output circuits, a plurality of arcuately arranged first contacts connected to the junctions of said serially connected arms, a plurality of arcuately arranged second contacts connected to the open terminals of the shunt resistors of each of said T-network sections, separate oppositely disposed arcuate short-circuiting contactors in selective operative relation with said first and second contacts, and means for actuating said contactors simultaneously to short-circuit predetermined ones of said first contacts and to open-circuit predetermined ones of said second contacts respectively, whereby complete T-network sections are switched in and out of the circuit connecting said input and output circuits and the input and output impedances of said attenuator remain substantially constant.

4. An attenuator according to claim 3 wherein said contactors are actuated simultaneously by a common shaft.

5. An attenuator according to claim 3 wherein said impedance sections are housed in a casing having concentric inner and outer walls, said contacts being supported by said inner wall.

6. An attenuator according to claim 3 wherein said impedance sections are housed in radially disposed compartments, said contacts being supported by the inner walls of said compartments for engagement by said contactors.

7. An attenuator according to claim 3 wherein said arcuate contactors are substantially semicircular, and including insulating members supporting said contactors and rotatable by a common shaft.

8. An attenuator according to claim 7 wherein said contactors are arranged in separate compartments, and a selective positioning device for holding said contactors in predetermined positions with respect to said contacts.

9. An attenuator according to claim 3 wherein said impedance sections are resistive.

IAN A. F. HOOD.
WARREN G. LUMB.

REFERENCES CITED

The following references are of record in the file of this patent:

UNITED STATES PATENTS

| Number | Name | Date |
|---|---|---|
| 1,892,215 | Mathieu | Dec. 27, 1932 |
| 2,333,659 | Mayer | Nov. 9, 1943 |

FOREIGN PATENTS

| Number | Country | Date |
|---|---|---|
| 546,205 | Great Britain | July 2, 1942 |